United States Patent [19]

Inouye et al.

[11] 4,294,453
[45] Oct. 13, 1981

[54] MECHANICAL SEAL
[75] Inventors: Hiroshi Inouye; Eiichi Sato, both of Ibaraki, Japan
[73] Assignee: Hitachi, Ltd., Tokyo, Japan
[21] Appl. No.: 136,368
[22] Filed: Apr. 1, 1980
[30] Foreign Application Priority Data
  Apr. 4, 1979 [JP] Japan .................. 54-39827
[51] Int. Cl.³ ............................ F16J 15/34
[52] U.S. Cl. ...................... 277/22; 277/41; 277/93 SD
[58] Field of Search .................. 277/22, 38–41, 277/81 R, 65, 93 R, 173, 93 SD, 174, 136, 176

[56] References Cited
U.S. PATENT DOCUMENTS

| 3,241,842 | 3/1966 | Schweiger et al. | 277/22 |
| 3,391,942 | 7/1968 | Wilson | 277/93 X |
| 3,420,535 | 1/1969 | Hershey | 277/93 X |
| 3,433,489 | 3/1969 | Wiese | 277/93 X |
| 3,612,548 | 10/1971 | Tracy | 277/41 X |
| 3,675,933 | 7/1972 | Nappe | 277/38 X |
| 4,039,196 | 8/1977 | Inouye | 277/11 |
| 4,114,900 | 9/1978 | Wiese | 277/93 SD |

Primary Examiner—Robert S. Ward, Jr.
Attorney, Agent, or Firm—Craig and Antonelli

[57] ABSTRACT

A mechanical seal suitable for providing a seal to a shaft sealing section of a rotary machine, particularly of the type operating under high speed and high pressure conditions, including a stationary retainer for holding a stationary sealing element, resilient means and recoil preventing means, a seal housing secured to the stationary retainer in a manner to surround the stationary sealing element, and an inwardly projecting portion formed in the seal housing to prevent axial movement of the stationary sealing element which might otherwise be caused by the biasing force of the resilient means when the mechanical seal is assembled or disassembled. The parts of the mechanical seal can be attached to the casing or detached therefrom as a unit.

8 Claims, 8 Drawing Figures

MECHANICAL SEAL

BACKGROUND OF THE INVENTION (1) Field of the Invention

This invention relates to a mechanical seal suitable for use in a shaft sealing section of a rotary machine, such as a centrifugal compressor, pump, etc., which is driven under high speed or high pressure condition.

(2) Description of the Prior Art

One type of mechanical seal of the prior art used in a shaft sealing section of a rotary machine comprises a rotary sealing element usually mounted on a rotary shaft for rotation therewith, a retainer secured in a seal box surrounding the rotary shaft, a sealing element held by the retainer, and resilient means for urging one sealing element against the other sealing element for providing a slidingly sealed surface between the two sealing elements. In this type of mechanical seal, difficulties are encountered in attaching and detaching the mechanical seal, particularly in handling the stationary sealing element and the retainer for holding same, because these parts must be attached to or detached from a space in the seal box surrounding the rotary shaft which is relatively small. When the seal box has a particularly small space, manual handling of these parts by the operator is faced with great difficulties. A mechanical seal of improved construction that facilitates the operation of attaching and detaching same is described in U.S. Pat. No. 4,039,196.

In recent years, mechanical seals are used under the condition of high speed or high pressure. It is essential that mechanical seals include parts formed of materials capable of withstanding such condition and constructed in a manner to be able to withstand such condition. This entails an increase in the weight of the mechanical seal as a whole which makes it necessary to use means, other than that which is disclosed in U.S. Pat. No. 4,039,196, for further providing improvements in an operation for attaching and detaching the mechanical seal to the shaft sealing section of a rotary machine. Also, in view of the high pressure and high speed conditions under which mechanical seals are required to operate nowadays, it is necessary that means be provided for effectively dissipating heat produced on the slidingly sealed surface of the mechanical seal.

SUMMARY OF THE INVENTION

Objects of the Invention

An object is to provide a mechanical seal wherein stationary parts thereof are surrounded at the outer periphery to avoid damage to the slidingly sealed surface and wherein the stationary parts are formed into a unitary structure for facilitating attaching and detaching of same in a seal housing.

Another object is to provide a mechanical seal wherein stationary parts and rotary parts thereof are surrounded at the outer periphery to avoid damage to the slidingly sealed surface and wherein the stationary parts and rotary parts are rendered unitary to facilitate attaching and detaching same in the seal housing.

Still another object is to provide a mechanical seal capable of satisfactorily cooling the circumference of the slidingly sealed surface of the mechanical seal.

Features of the Invention

In order to accomplish the aforesaid objects, the invention provides various features in a mechanical seal including a rotary sealing element rotating together with a rotary shaft, and a stationary sealing element arranged on a casing through resilient means and recoil preventing means, so that a sealed surface is provided by the two sealing elements. Such features include a stationary retainer located opposite the sealed surface with respect to the stationary sealing element for holding the stationary sealing element, resilient means and recoil preventing means, and a seal housing secured to the stationary retainer for enclosing the stationary sealing element and including a portion projecting inwardly from its side near the sealed surface for preventing axial movement of the stationary sealing element caused by the biasing force of the resilient means when the seal is disassembled. The stationary retainer and the seal housing as well as the stationary sealing element, resilient means and recoil preventing means is formed into a unitary structure readily attached to and detached from the casing.

Additional and other objects, features and advantages of the invention will become evident from the description of the embodiments set forth hereinafter when considered in conjunction with the accompanying drawings.

DESCRIPTION OF THE PREFERRED EMBODIMENTS

Figure 1:
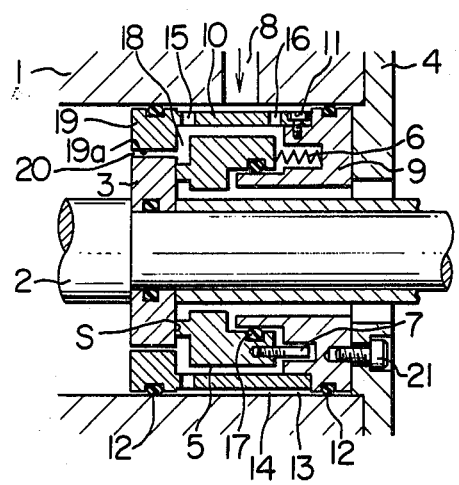
FIG. 1 is a vertical sectional view of the mechanical seal comprising a first embodiment of the invention.

FIG. 1 shows a first embodiment of the mechanical seal in conformity with the present invention. The numeral 1 designates a casing, and the numeral 2 a rotary shaft having secured thereto a rotary sealing element 3 for rotation therewith. The casing 1 has secured to its right end a flange 4 which has mounted on its inner surface a stationary retainer 9 for holding a stationary sealing element 5 presently to be described. The stationary sealing element 5 which is secured to the stationary retainer 9 for axial movement is forced by the biasing force of resilient means 6 against the rotary sealing element 3 and held against rotation by recoil preventing means 7. The stationary sealing element 5 and the rotary sealing element 3 are in contact with each other to provide a sealed surface S. A cooling fluid passage 8 is formed in the casing 1 for supplying a cooling fluid for removing heat produced by the rotary sealing element 3 which rotates while being in sliding contact with the stationary sealing element 5.

The stationary retainer 9 is provided with a seal housing 10 enclosing the stationary sealing element 5 which is secured unitarily to the stationary retainer 9 by fastening means 11, such as bolts. Sealing means 12, such as O-rings, are mounted on the outer circumferential surface of the seal housing 10 near the rotary sealing element 3 and on the outer circumferential surface of the stationary retainer 9 remote from the rotary sealing element 3. In this embodiment, the sealing means 12 is mounted on the outer circumferential surface of the seal housing 10 near the rotary sealing element 3, but the sealing means 12 in this position may be dispensed with. Formed on the outer circumferential surface of the seal housing 10 between the two sealing means 12 is an annular groove 13 constituting a cooling fluid passage 14 for permitting the cooling fluid from the cooling fluid passage 8 in the casing 1 to flow uniformly between the inner surface of the casing 1 and the outer surface of the seal housing 10. The cooling fluid in the cooling fluid passage 14 is retained therein by the sealing means 12 without flowing to outside. A plurality of openings 15 are formed in the seal housing 10 in the vicinity of the sealed surface S and arranged circumferentially for permitting the cooling fluid in the cooling fluid passage 14 to be ejected therethrough in jet streams against the sealed surface S. The provision of the openings 15 allows forced cooling of the sealed surface S to be effected uniformly along the entire circumference of the sealed surface S by the jet streams of cooling fluid. More than one opening 16 is formed in the seal housing 10 near the back of the stationary sealing element 5 and arranged circumferentially for permitting the cooling fluid in the cooling fluid passage 14 to be ejected in jet streams against the back of the stationary sealing element 5, like the openings 15. The jet streams of cooling fluid ejected through the openings 16 not only cool the back of the stationary sealing element 5 but also wash out any dust which might be deposited on the back of the stationary sealing element 5. The cooling action of the cooling fluid from the openings 16 is conductive to prevention of wear which would otherwise be caused on the resilient means 6 and a secondary seal 17 disposed at the back of the stationary sealing element 5. The cooling fluid ejected in jet streams against the back of the stationary sealing element 5 flows into a cooling fluid swirling portion 18 formed near the sealed surface S after flowing along the outer peripheral surface of the stationary sealing element 5 and cooling same. The seal housing 10 is formed on the rotary sealing element side an inwardly projecting portion 19 which has the effect of preventing the axial movement of the stationary sealing element 5 by the biasing force of the resilient means 6 when the seal is disassembled. The inwardly projecting portion 19 has a surface 19a which is spaced apart from the outer circumferential surface of the rotary sealing element 3 by a narrow clearance 20 which has the function of increasing the cooling of the sealed surface S. More specifically, the cooling fluid ejected through the openings 15 and 16 in jet streams join one another in the cooling fluid swirling portion 18 and flows into the narrow clearance 20 after uniformly cooling the sealed surface S. When the circumferential area of the narrow clearance 20 is substantially the same as that of the cooling fluid swirling portion 18, the cooling fluid does not uniformly cool the outer circumferential surface of the rotary sealing element 3 and selectively passes through portions of the outer circumferential surface of the rotary sealing element 3, so that the cooling fluid does not uniformly remove heat from the sealed surface S after such heat is produced by the rotary sealing element 3 rotating while being in sliding contact with the stationary sealing element 5. Thus a temperature gradient is produced circumferentially of the sealed surface S. As a result, the two sealing elements 3 and 5 are not in uniform contact with each other at the sealed surface S, thereby reducing the sealing ability of the seal. The narrow clearance 20 is of a construction capable of avoiding this defect. The provision of the narrow clearance 20 of the specific construction permits the cooling fluid of the cooling fluid swirling portion 18 to flow uniformly through the narrow clearance 20 and at high flow velocity to thereby improve heat transfer in the outer circumferential surface of the rotary sealing element 3. Thus an increase in the temperature of the sealed surface S can be avoided and the sealed surface S can be maintained in good condition even if the rotary machine is operated under conditions of high pressure and high speed rotation.

The stationary sealing element 5, resilient means 6 and recoil preventing means 7 are located in a space defined by the stationary retainer 9 and seal housing 10. This enables the stationary parts of the mechanical seal to be built into a cartridge which makes it possible to attach or detach the stationary parts to a shaft sealing section as a unit. Before the stationary parts of the mechanical seal are attached to a shaft sealing portion, the stationary sealing element 5 is urged by the biasing force of the resilient means 6 to move leftwardly in FIG. 1, but the axial movement of the stationary sealing element 5 is prevented by the abutting engagement of a front shoulder of the stationary sealing element 5 with the inwardly projecting portion 19 of the seal housing 10, thereby avoiding dislodging of the stationary sealing element 5 from the stationary retainer 9. Since the stationary sealing element 5 is enclosed by the seal housing 10, the sealed surface S can be protected against any damage which might otherwise be caused thereto when the mechanical seal is transported or handled. The stationary retainer 9 is secured to the flange 4 by fastening means 21, such as bolts, against rotation.

The operation of assembling the stationary parts of the mechanical seal of the construction described hereinabove to a shaft sealing section will now be described. First, the stationary parts of the mechanical seal are assembled into a unitary structure. Then, the unitary structure is inserted in the casing 1 from the upper right side in FIG. 1. This brings the stationary sealing element 5 into contact with the rotary sealing element 3 to form therebetween the sealed surface S. Thereafter, the flange 4 is secured to the casing 1, and the stationary retainer 9 is secured to the flange 4 by the fastening means 21, thereby completing an assembling operation. Alternatively, the flange 4 may be secured by the fastening means 21 to the stationary retainer 9 of the stationary parts of the mechanical seal formed beforehand into a unitary structure, and then secured to the casing 1 so that the stationary parts in unitary structure may be assembled into the casing 1. The stationary parts may be withdrawn as a unit from the casing 1 by reversing the process.

Figure 2:
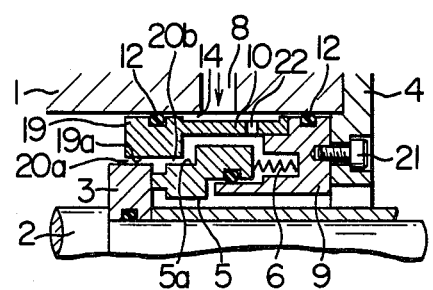
FIG. 2 is a vertical sectional view of the mechanical seal comprising a second embodiment of the invention.

FIG. 2 shows a second embodiment of the mechanical seal in conformity with the invention. In the figure, parts similar to those shown in FIG. 1 are designated by like reference characters. This embodiment is distinct from the first embodiment in that the surface 19a of the inwardly projecting portion 19 of the seal housing 1 near the rotary sealing element 3 is disposed close to the outer circumferential surface of the rotary sealing element 3 and an outer circumferential surface 5a of a minor diameter portion 5a of the stationary sealing element 5 to define therebetween narrow clearances 20a and 20b respectively. In this embodiment, openings 22 for ejecting cooling fluid in jet streams are formed in the seal housing 10 in the vicinity of the back of the stationary sealing element 5. However, the openings 22 may be formed in the seal housing 10 in the vicinity of the rotary sealing element 3.

In this embodiment also, the stationary parts of the mechanical seal can be formed into a unitary structure. The cooling fluid flows uniformly through the small clearances 20a and 20b and efficiently removes heat from the sealed surface S as the heat is produced as a result of sliding contact between the two sealing elements 3 and 5, thereby avoiding the development of a circumferential temperature gradient on the sealed surface S.

Figure 3:
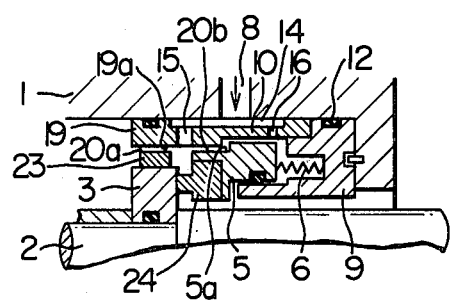
FIG. 3 is a vertical sectional view of the mechanical seal comprising a third embodiment of the invention.

FIG. 3 shows a third embodiment of the mechanical seal in conformity with the invention. This embodiment is distinct from the first and second embodiments in that a reinforcing ring 23 is mounted on the outer circumferential surface of the rotary sealing element 3, and a sliding member 24 is connected to the stationary sealing element 5. The surface of the inwardly projecting portion 19 of the seal housing 10 near the rotary sealing element 3 is disposed close to the outer circumferential surface of the reinforcing ring 23 and the outer circumferential surface 5a of the minor diameter portion of the stationary sealing element 5, to define narrow clearances 20a and 20b therebetween respectively. The openings 15 for ejecting a cooling fluid in jet streams are interposed between the two narrow clearances 20a and 20b.

By this arrangement, the cooling fluid can be made to uniformly flow through the narrow clearances 20a and 20b in the same manner as in the second embodiment shown in FIG. 2, thereby enabling the heat produced by sliding contact between the two sealing elements 3 and 5 to be efficiently removed and the development of a circumferential temperature gradient on the sealed surface S to be avoided. In this embodiment also, the stationary parts of the mechanical seal can be formed into a unitary structure.

Figure 4:
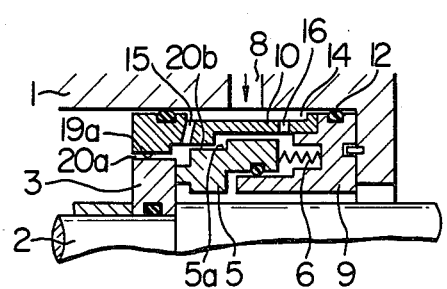
FIG. 4 is a vertical sectional view of the mechanical seal comprising a fourth embodiment of the invention.

FIG. 4 shows a fourth embodiment of the mechanical seal in conformity with the invention. In this embodiment, the outer circumferential surface of the rotary sealing element 3 has a smaller diameter than the outer circumferential surface 5a of the minor diameter portion of the stationary sealing element 5, and the inwardly projecting portion 19 of the seal housing 10 is offset in one corner of its surface. The narrow clearances 20a and 20b are defined between the surface of the inwardly projecting portion 19 and the outer circumferential surface of the rotary sealing element 3 and the outer circumferential surface 5a of the minor diameter portion of the stationary sealing element 5 respectively.

By this arrangement, this embodiment can achieve the same effects as the embodiments shown in FIGS. 2 and 3.

In the embodiments shown in FIGS. 3 and 4, the stationary parts of the mechanical seal forming a unitary structure are inserted in the casing 1 from the upper left side in each figure. In this case, the stationary parts of the mechanical seal are first inserted in the casing 1 and then the rotary sealing element 3 is fitted to the rotary shaft 2 from the upper left side in each figure.

Figure 5:
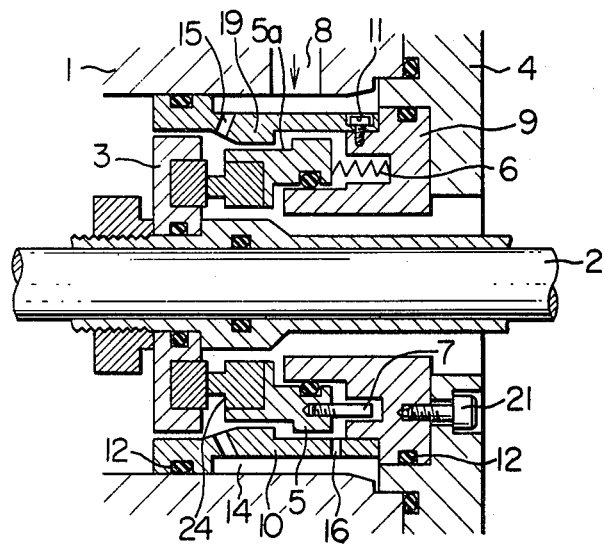
FIG. 5 is a vertical sectional view of the mechanical seal comprising a fifth embodiment of the invention.

FIG. 5 shows a fifth embodiment of the mechanical seal in conformity with the invention. In this embodiment, the outer circumferential surface of the rotary sealing element 3 is smaller in diameter than the outer circumferential surface 5a of the minor diameter portion of the stationary sealing element 5 as opposed to the embodiment shown in FIG. 4, and the surface 19a of the inwardly projecting portion 19 is shaped to be complementary with these outer circumferential surfaces, to define the narrow clearances 20a and 20b respectively therebetween.

By this arrangement, the embodiment shown in FIG. 5 can achieve the same effects as the embodiments shown in FIGS. 3 and 4.

Figure 6:
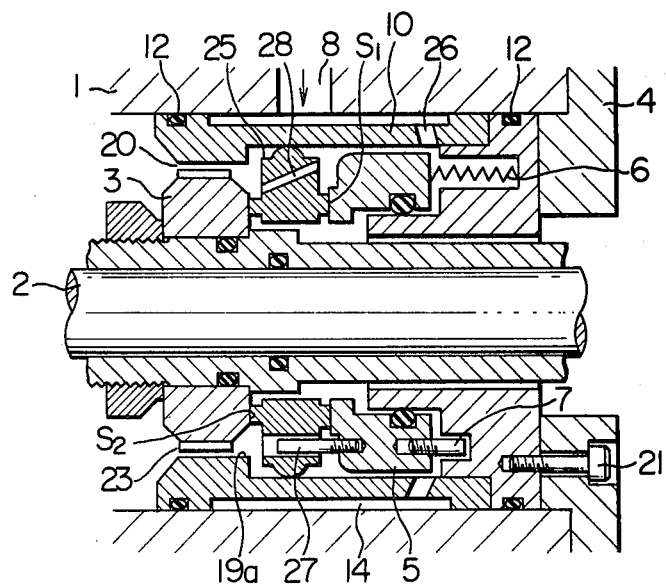
FIG. 6 is a vertical sectional view of the mechanical seal comprising a sixth embodiment of the invention.

FIG. 6 shows a sixth embodiment of the mechanical seal in conformity with the invention. In this embodiment, the invention is incorporated in a mechanical seal of the type having an intermediate ring 25 between the rotary sealing element 3 and stationary sealing element 5. More specifically, the inwardly projecting portion 19 of the seal housing 10 abuts against the right end surface of the intermediate ring 25 before being attached to a shaft sealing section, and the reinforcing ring 23 mounted on the outer circumferential surface of the rotary sealing element 3 and the inner circumferential surface 19a of the inwardly projecting portion 19 of the seal housing 10 define therebetween a small clearance 20. In this embodiment, the cooling fluid from the cooling fluid passage 14 flows through openings 26 formed in the seal housing 10 for ejecting the cooling fluid in jet streams, flows along the outer circumferential surface of the stationary sealing element 5 while cooling same, and reaches a sealed surface S1 between the intermediate ring 25 prevented from rotating by a recoil preventing pin 27 and the stationary sealing element 5. The cooling fluid further flows through passages 28 formed in the intermediate ring 25 to remove heat generated at a sealed surface S2 between the rotary sealing element 3 and intermediate ring 25 and transferred to the latter. Thus the cooling fluid reaches the sealed surface S2 to remove heat produced by the sliding contact between the element 3 and ring 25, before flowing through the small clearance 20.

Like the embodiments shown and described previously, the mechanical seal provided with the intermediate ring 25 can have its stationary parts assembled into a unitary structure, and can have its sealed surfaces S1 and S2 satisfactorily cooled by incorporating therein the features of the invention.

Figure 7:
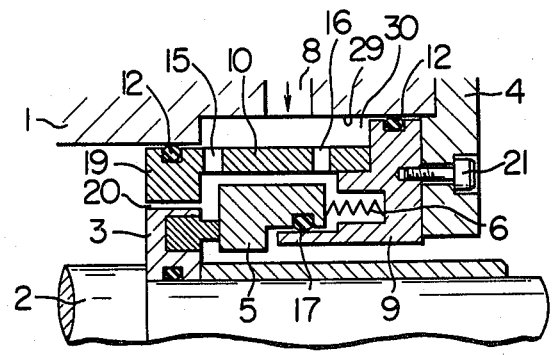
FIG. 7 is a vertical sectional view of the mechanical seal comprising a seventh embodiment of the invention.

FIG. 7 shows a seventh embodiment of the mechanical seal in conformity with the invention. This embodiment has an annular groove 29 formed on the inner surface of the casing 1 disposed in spaced juxtaposed relation to the outer circumferential surface of the seal housing 10, so that an annular cooling fluid passage 30 can be defined by the outer circumferential surface of the seal housing 10.

This arrangement has the effects of minimizing the number of steps required for working the seal housing 10 and of minimizing damage to the sealing means 12 which might be caused when the stationary parts of the mechanical seal are inserted in the casing 1.

Figure 8:
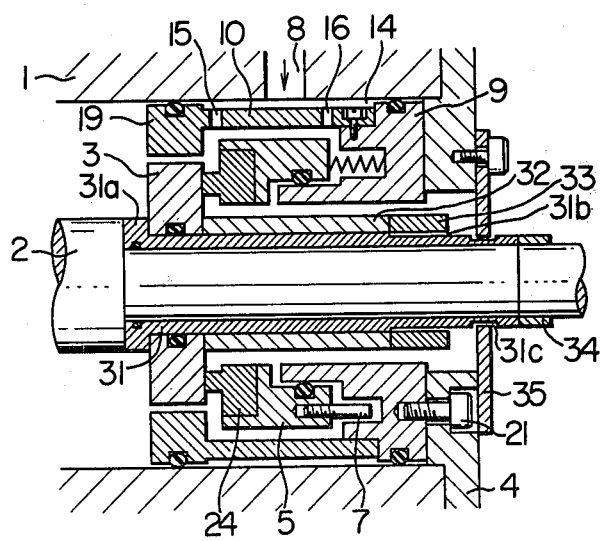
FIG. 8 is a vertical sectional view of the mechanical seal comprising an eighth embodiment of the invention.

FIG. 8 shows an eighth embodiment of the mechanical seal in conformity with the invention. In this embodiment, not only the stationary parts of the mechanical seal but also the rotary parts including the rotary sealing element 3 can be arranged into a unitary structure contained in a cartridge. More specifically, a sleeve 31 fitted over the rotary shaft 2 is formed at one end with a projection 31a for positioning the rotary sealing element 3 and at the other end with a threaded portion 31b and an annular groove 31c. After fitting the rotary sealing element 3 and an auxiliary sleeve 32 over the sleeve 31, a nut 33 is threadably connected to the threaded portion 31b, to secure the rotary sealing element 3 to the sleeve 31. The rotary parts of the mechanical seal arranged into a unitary structure as described hereinabove are inserted from the right side in the figure and fitted over the rotary shaft 2 as by a key. The sleeve 31 is secured to the rotary shaft 1 and prevented from axial relative movement as by a nut 34 threadably engaging the rotary shaft 1. Thus by removing the nut 34 from the rotary shaft 1, the sleeve 31 can be removed from the rotary shaft 1.

When the stationary parts and the rotary parts of the mechanical seal are detached from the casing 1, split clamps 35 secured to the flange 4 can have their inner surfaces inserted in the annular groove 31c of the sleeve 31, so that the stationary parts and the rotary parts of the mechanical seal can be arranged into a unitary structure.

By this arrangement, the stationary parts and the rotary parts of the mechanical seal can be removed as a unit from the casing 1 by releasing the flange 4 from the casing 1 and moving the former rightwardly relative to the latter in FIG. 8.

From the foregoing description, it will be appreciated that the present invention enables the stationary parts and the rotary parts of a mechanical seal to be arranged into separate unitary structures or a single unitary structure, thereby facilitating the attaching and detaching of the mechanical seal. As a result, marked improvements can be made in the maintenance of a mechanical seal. Also, according to the invention, a cooling fluid is ejected in jet streams toward the sealed surface and clearance means is provided on the outer circumferential surfaces of the sealing elements near the sealed surface for forming uniform flow of the cooling fluid, thereby permitting heat produced by the sliding contact between the two sealing elements to be efficiently dissipated.

What is claimed is:

1. A mechanical seal comprising:
    a rotary sealing element rotatable with a shaft; and
    a stationary sealing element secured to a casing through resilient means and recoil preventing means to cooperate with said rotary sealing element to form a sealed surface;
    wherein the improvement comprises:
    a stationary retainer located opposite said sealed surface with respect to said stationary sealing element for holding said stationary sealing element, said resilient means and said recoil preventing means;
    a seal housing provided to said stationary retainer for enclosing said stationary sealing element; and
    an inwardly projecting portion formed in said seal housing in a portion thereof near said sealed surface for preventing axial movement of said stationary sealing element which might otherwise be caused by the biasing force of said resilient means when the seal is disassembled, whereby the stationary retainer including said stationary sealing element, said resilient means and said recoil preventing means as well as said seal housing can be attached to and detached from the casing as a unit.

2. A mechanical seal as claimed in claim 1, wherein the improvement further comprises a sleeve detachably mounted on said shaft and having said rotary sealing element secured thereto, said rotary sealing element and stationary parts of the seal including the stationary sealing element, the stationary retainer, the resilient means and the recoil preventing means assembled with said rotary sealing element and the seal housing being attached to or detached from a shaft sealing section as a unit as said sleeve is fitted over or removed from said shaft.

3. A mechanical seal as claimed in claim 1 or 2, wherein the improvement further comprises an annular cooling fluid passage defined between the outer circumferential surface of said seal housing and the inner circumferential surface of said casing and communicating with a cooling fluid passage in said casing, and a plurality of openings formed in said seal housing in the vicinity of said sealed surface for permitting a cooling fluid in said cooling fluid passage to be ejected in jet streams against said sealed surface.

4. A mechanical seal as claimed in claim 3, wherein the improvement further comprises at least one opening formed in said seal housing in the vicinity of the back of said stationary sealing element for permitting the cooling fluid in the cooling fluid passage to be ejected in jet streams against the back of the stationary sealing element.

5. A mechanical seal as claimed in claim 4, wherein the improvement further comprises a small clearance defined between the inner circumferential surface of said seal housing in a portion thereof near said rotary sealing element and the inner circumferential surface of said rotary sealing element which surfaces are so close to each other that said small clearance has a throttling function.

6. A mechanical seal as claimed in claim 4, wherein the improvement further comprises small clearances defined between the inner circumferential surface of a portion of said seal housing near said rotary sealing element on one hand and the outer circumferential surface of said stationary sealing element and the outer circumferential surface of a portion of said stationary sealing element near said sealed surface respectively on the other which surfaces are so close to each other that said small clearances each have a throttling function.

7. A mechanical seal as claimed in claim 3, wherein the improvement further comprises a small clearance defined between the inner circumferential surface of said seal housing in a portion thereof near said rotary sealing element and the inner circumferential surface of said rotary sealing element which surfaces are so close to each other that said small clearance has a throttling function.

8. A mechanical seal as claimed in claim 3, wherein the improvement further comprises small clearances defined between the inner circumferential surface of a portion of said seal housing near said rotary sealing element on one hand and the outer circumferential surface of said stationary sealing element and the outer circumferential surface of a portion of said stationary sealing element near said sealed surface respectively on the other which surfaces are so close to each other that said small clearances each have a throttling function.

* * * * *